Figure 1:
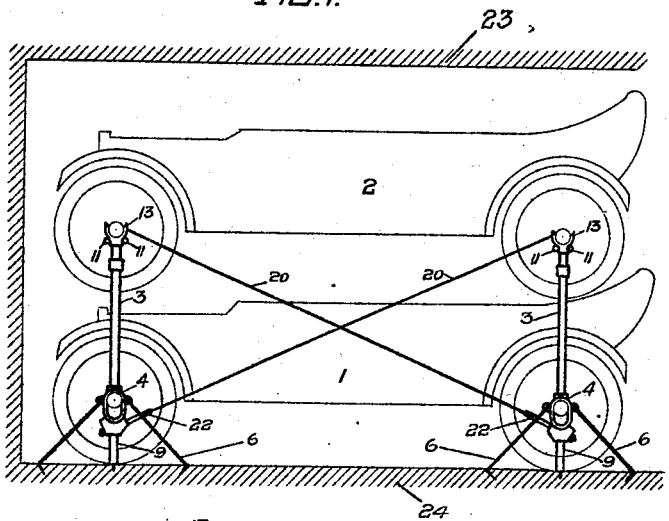

July 13, 1926.

A. COPONY

DECKING DEVICE

Filed May 4, 1923

1,591,964

WITNESSES.

Alfred Copony
INVENTOR.

Patented July 13, 1926.

1,591,964

UNITED STATES PATENT OFFICE.

ALFRED COPONY, OF MOUNT CLEMENS, MICHIGAN.

DECKING DEVICE.

Application filed May 4, 1923. Serial No. 636,631.

My improvements relate to the loading and decking of automobiles in freight cars and have for their object not only the proper holding and securing of the upper automobile in its position but they also provide means for simultaneously securing the lower machine in place, thereby saving the use of wheel blocks, tie-downs and nails for the lower machine and incidental labor and freight charges connected therewith. As my device as shown in the drawing is of a foldable construction it is very well adapted for repeated use as it can be easily reshipped to the automobile plant without packing or crating.

Figure 2:
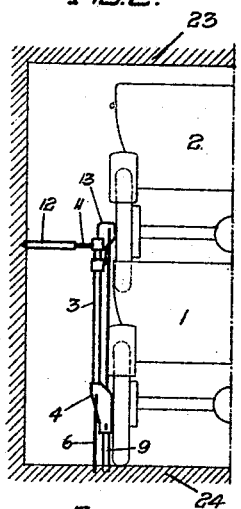
Figure 3:
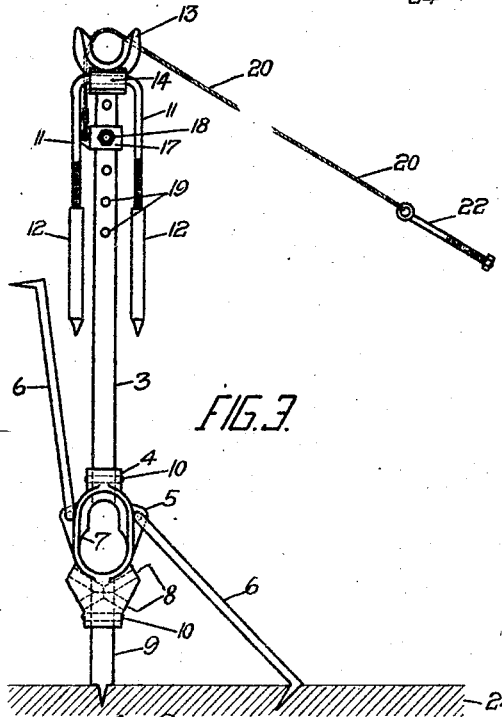
Figure 4:
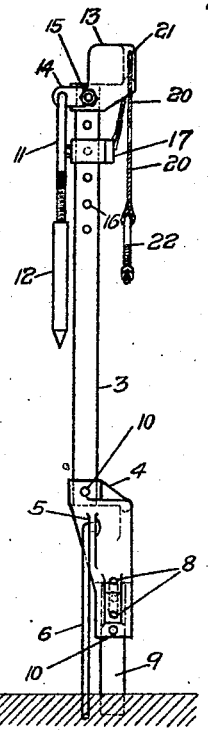

In the drawing, Fig. 1 shows a diagrammatic side view of my construction applied to two automobiles placed in the end of a freight car, with the side of the freight car removed, Fig. 2 shows one symmetrical half of a diagrammatic end view of Fig. 1. Fig. 3 shows in detail a side view of one of my decking standards while Fig. 4 shows an end view of Fig. 3.

The embodiment of my invention is shown in connection with a railroad freight car outlined in 23, Figs. 1 and 2, of usual construction as far as the general structure of the car is concerned. 1 indicates the lower automobile to be fastened to the floor, while 2 shows the outline of the upper automobile to be supported above the lower automobile 1. For this purpose a steel column 3, preferably of pipe construction is provided, which terminates in, and is fastened to lower hub bracket 4, by means of pin 10. This lower hub bracket 4 is provided with a key hole recess 7, the large semi-circular portion of which lends itself to be fitted over the hub cap of an automobile wheel, while the upper narrower portion of this key hole will grip the hub of an automobile wheel between the inside face of the hub cap and the spokes of the wheel, if lowered over the wheel. Lower hub bracket 4 is further provided with cable brace bolt holes 8 which extend diagonally in a vertical plane parallel to the axis of an automobile when in place and will accommodate brace cable eye bolt 22 of the opposite unit of the structure. An extension of the lower hub bracket 4 consists of a lower hub bracket foot 9 fastened by pin 10 to said bracket 4 and sharpened at its lower end and adapted to enter a car floor 24. Means for fastening this structure to the floor are provided in floor braces 6, pivoted in brace lugs 5 of lower hub bracket 4 which are adapted to be driven into a car floor 24 at their free end. The upper end of column 3 is slidably connected with upper hub bracket 13 which can be permanently adjusted at any height by means of upper hub bracket bolt 15, Fig. 4, and holes 16 in column 3. Upper hub bracket 13 is also shaped to contain an automobile wheel by the hub between the hub cap and the spokes. U-side braces 11 are fastened to upper hub bracket 13 by means of a U-side brace socket 14 and further, U-side brace 11 can be shortened or lengthened by means of side brace feet 12 which are pointed at one end and tapped at the other end, to screw onto the free end of U-side braces 11. These U-side braces while shown as acting as double braces can be made as single braces if so desired without detracting from the purpose and aim of my construction. A brace cable 20 is fastened at one end to a slidable and adjustable cable collar 17 which is fastened by means of cable collar bolt 18 to one of holes 19 of column 3. This brace cable 20 is slidably mounted in brace cable hole 21 Fig. 4 of upper hub bracket 13 and terminates at its free end in brace cable eye bolt 22.

In use, the upper automobile is first raised by means of chain falls into a position somewhat higher than indicated in Figs. 1 and 2. Then the lower automobile 1 is put into place. Thereafter my structure is placed by slipping lower hub bracket 4 over the hub caps of the lower automobile, adjusted in a vertical position and temporarily fastened by means of the floor braces 6. Brace cable 20 is pulled out sidewise from the upper hub bracket 13 and then the upper automobile is lowered into place. This will distribute the weight of the upper automobile partly onto the axle of the lower automobile, by means of the hub of lower automobile 1 and lower hub bracket 4 of my structure, while the balance of the weight of upper automobile 2 will force the point of lower hub bracket foot 9 into car floor 24. Then U-side brace 11 is swung into position so that the free end of the U-side brace 11 consisting of side brace foot 12 engages with a solid part of car structure 23. This is accomplished by revolving side brace foot 12 by means of a pipe wrench or other suitable tool until the pointed end of the foot enters well into the side of the railroad car. This is done simultaneously at opposing points of the structures with a view of eliminating all possibility of side sway when the railway car is in motion. Then brace cable bolts 22 are adjusted in brace cable bolt holes 8 of the opposite structure on the same side of the automobiles as shown in Figs. 1 and 2, they are adjusted over the hub, the slack is partially taken up by adjustment of cable collar 17 by means of cable collar bolts 18 on column 3. Then the braces are finally tightened by screwing home the nut of brace cable eye bolt 22. This automatically tightens the hub of the upper automobile 2 in upper hub bracket 13 and prevents dislodgment of the former when in transit at the same time stiffening the whole structure against end shocks. As a final means of fastening, the floor braces 6 are driven fully into the car floor the chain falls with which the upper automobile has been raised in place are removed, and the car is ready for shipment to destination. The unloading of the automobile is accomplished in a similar manner, but the operations are reversed.

While the structure shown in the drawing is of a permanent form adapted to be reshipped and used over again, it also can be made of wood in a cheap way and used for single shipments only. In that case either all of the members can be made of wood, including the cross braces, or, the cross braces can be made of heavy wire and tightened by twisting the wires with a stick.

The device shown being illustrative of its character, it is to be understood that variations other than that shown in the illustrations are included in the scope and within the principle of my invention.

Having described my invention, what I claim as new and desire to secure by Letters Patent is:

1. In combination with a freight car, offset means for supporting the weight of an upper automobile in substantially vertical planes, means for engaging a lower automobile with said vertical supporting means, means for transmitting part of said weight of said upper automobile to said lower automobile, triangular bracing means to transmit dynamic shocks of said upper automobile in substantially vertical planes to the floor of said freight car, and transverse bracing means to the side of said freight car to take up the side sway of said automobiles while in transit.

2. In combination with a freight car, offset columnar supporting means located in substantially vertical parallel planes and close to an automobile, for supporting one automobile above another, means for angularly bracing said automobile, said angular bracing means to be located in substantially vertical planes close to and parallel with said automobile, said angular bracing means to act simultaneously as retaining means to fasten said upper automobile to said supporting means.

3. In combination with a freight car, offset columnar means for supporting the hubs of one upper automobile, means for engaging said offset columnar means with the hubs of a lower automobile, and means for triangularly bracing said offset columnar means, at the point of engagement with said upper and lower automobile, in substantially vertical parallel planes, to the floor of said freight car.

4. In combination with a freight car, offset means for adjustably supporting an automobile, means for holding a lower automobile by means of said upper automobile supporting means, means for adjustably and angularly bracing said upper automobile in a vertical plane parallel to the side of the freight car, and adjustable transverse bracing means to take up the side sway of said upper automobile while in transit.

5. In a decking device for automobiles in freight cars, the combination of vertical columnar supports, with pivotal bracing means shaped and adapted to engage with and bodily enter into the structure of said freight car.

ALFRED COPONY.